United States Patent
Sakaguchi et al.

(10) Patent No.: US 9,041,287 B2
(45) Date of Patent: May 26, 2015

(54) HIGH-PRESSURE DISCHARGE LAMP HAVING AN ARC TUBE IN WHICH A PAIR OF ELECTRODE RODS ARE DISPOSED, LUMP UNIT, AND PROJECTOR-TYPE IMAGE DISPLAY APPARATUS

(71) Applicant: PANASONIC CORPORATION, Osaka (JP)

(72) Inventors: Jun Sakaguchi, Osaka (JP); Yoshiki Kitahara, Osaka (JP); Hiroki Ogawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 109 days.

(21) Appl. No.: 13/909,173

(22) Filed: Jun. 4, 2013

(65) Prior Publication Data

US 2013/0335715 A1    Dec. 19, 2013

(30) Foreign Application Priority Data

Jun. 19, 2012 (JP) ................ 2012-137702

(51) Int. Cl.
*H01J 5/50* (2006.01)
*H01J 61/36* (2006.01)
*G03B 21/28* (2006.01)
*G03B 21/20* (2006.01)

(52) U.S. Cl.
CPC .............. *H01J 61/366* (2013.01); *G03B 21/28* (2013.01); *G03B 21/2026* (2013.01); *H01J 61/368* (2013.01)

(58) Field of Classification Search
CPC ....... H01J 61/366; H01J 61/36; H01J 61/368; H01J 61/86; H01J 61/0732
USPC .......................... 313/623, 491, 493
See application file for complete search history.

(56) References Cited

U.S. PATENT DOCUMENTS

| 2001/0005117 A1 | 6/2001 | Nishida et al. |
| 2003/0052603 A1 | 3/2003 | Takahashi et al. |
| 2010/0013369 A1 | 1/2010 | Kitahara et al. |
| 2010/0188855 A1 | 7/2010 | Sakaguchi et al. |

FOREIGN PATENT DOCUMENTS

| JP | 2001-189149 | 7/2001 |
| JP | 2004-006424 | 1/2004 |
| JP | 2004-039349 | 2/2004 |
| JP | 2009-043701 | 2/2009 |
| JP | 2009-152165 | 7/2009 |
| JP | 2010-129426 | 6/2010 |

*Primary Examiner* — Joseph L Williams
(74) *Attorney, Agent, or Firm* — Greenblum & Bernstein, P.L.C.

(57) ABSTRACT

A high-pressure discharge lamp having an arc tube with a casing made of glass. The arc tube includes a light-emitting part and sealing parts connected to the light-emitting part. A pair of electrode rods are disposed within the glass casing such that their tips face each other with a gap therebetween and project into the discharge space, and their base ends are embedded in the sealing parts and overlap surfaces of metal foils provided in the sealing parts. Each base end is coated with a coating foil made of metal and having a C-like cross section with a slit formed between edges thereof. An end of the coating foil farthest from the light-emitting part is located closer to the light-emitting part than an end of the metal foil closest to the light-emitting part.

8 Claims, 39 Drawing Sheets

FIG. 9

|  | Comparative example | Present disclosure |
|---|---|---|
| Breakage in the aging process in the manufacturing | 2/195 (1.03%) | 0/191 (0.00%) |
| Breakage in the middle of the lifespan | 1/192 (0.52%) | 0/180 (0.00%) |

HIGH-PRESSURE DISCHARGE LAMP HAVING AN ARC TUBE IN WHICH A PAIR OF ELECTRODE RODS ARE DISPOSED, LUMP UNIT, AND PROJECTOR-TYPE IMAGE DISPLAY APPARATUS

TECHNICAL FIELD

The present disclosure relates to structures of a high-pressure discharge lamp, a lamp unit using the same, and a projector-type image display apparatus.

DESCRIPTION OF THE RELATED ART

As a light source for a projector-type image display apparatus such as a liquid crystal projector, a high-pressure discharge lamp is often used. A high-pressure discharge lamp substantially serves as a point light source with a high intensity and a high color rendering index. For example, a short arc high-pressure mercury lamp (Hereinafter simply referred to as "high-pressure mercury lamp") is commonly used as such a high-pressure discharge lamp.

Generally, a high-pressure mercury lamp has an arc tube composed of a light-emitting part and sealing parts. As examples of high-pressure mercury lamps, those having a structure for preventing breakage of the sealing parts have been proposed (c.f. Japanese Patent Application Publication No. 2010-129426, Japanese Patent Application Publication No. 2001-189149, Japanese Patent Application Publication No. 2004-39349).

FIG. 1 is a frontal cross-sectional view showing a structure of an arc tube 141 of a high-pressure mercury lamp (See Japanese Patent Application Publication No. 2010-129426). The arc tube 141 has a light-emitting part 142 and sealing parts 143 and 144. The light-emitting part 142 is located in the middle of the arc tube 141 and has a substantially spheroidal shape. The sealing parts 143 and 144 are connected to the ends of the light-emitting part 142 and each has a substantially columnar shape. A casing 141a of the arc tube 141 is made of fused quartz glass. The light-emitting part 142 encloses a light-emitting material such as mercury. A discharge space 147 is formed within the light-emitting part 142. In the discharge space 147, a pair of electrodes 145 and 146 made of tungsten (W) are disposed such that their respective tips face each other. The electrodes 145 and 146 respectively include electrode rods 145a and 146a. Metal foils 148 and 149 are welded to the respective base ends of the electrode rods 145a and 146a. Each of the metal foils 148 and 149 is made of a rectangular strip of molybdenum (Mo). Here, the term "base end" of the electrode rod is the opposite end to the end that projects into the discharge space. External lead wires 109 and 110 are respectively connected to the metal foils 148 and 149. The electrode rods 145a and 146a are respectively coated with coating foils 152 and 153 each having a sleeve-like shape.

The coating foils 152 and 153 are made of molybdenum. Therefore, the coating foils 152 and 153 serve as buffers between the casing 141a made of fused quartz glass and the electrode rods 145a and 146a made of tungsten. Consequently, the coating foils 152 and 153 reduce the stress due to the difference in thermal expansion coefficient between the casing 141a and the electrode rods 145a and 146a. Thus, the high-pressure mercury lamp prevents breakage of the casing 141a.

Also, Japanese Patent Application Publication No. 2001-189149 discloses a structure of the sealing part in which the joint part and its vicinity between the base end of the electrode rod and the metal foil is coated with a coating foil having a cylindrical shape with a slit, or a netlike shape. Note that the term "the joint part" between the base end of the electrode rod and the metal foil means the part of the base end of the electrode rod where runs on and overlaps the metal foil and is connected to the metal foil by welding or the like. It is disclosed that such a structure reduces the thermal stress during a high-temperature manufacturing process or during the operation of the high-pressure discharge lamp, and prevents the occurrence of a crack.

Furthermore, Japanese Patent Application Publication No. 2004-39349 discloses a structure of the sealing parts including the electrode rods coated with coating foils made of glass and coils wound around the electrode rods. It is disclosed that such a structure homogenizes the thermal stress distribution around the electrode rods, and thereby prevents concentration of the thermal stress and occurrence of a crack.

CITATION LIST

Patent Literature

[Patent Literature 1] Japanese Patent Application Publication No. 2010-129426
[Patent Literature 2] Japanese Patent Application Publication No. 2001-189149
[Patent Literature 3] Japanese Patent Application Publication No. 2004-39349
[Patent Literature 4] Japanese Patent Application Publication No. 2009-43701
[Patent Literature 5] Japanese Patent Application Publication No. 2009-152165

SUMMARY

In recent years, even high output is demanded for high-pressure discharge lamps. To meet the desire, the rated powers of the high-pressure discharge lamps are increasing accordingly. However, it has been found that the increase in the power causes breakage of the casing of the sealing part of the arc tube due to a new factor.

One non-limiting and exemplary embodiment provides a high-output high-pressure discharge lamp that prevents breakage of the casing of the sealing part.

In one general aspect, the techniques disclosed here feature a high-pressure discharge lamp comprising an arc tube, wherein the arc tube includes: a light-emitting part within which a discharge space is formed; sealing parts connected to the light-emitting part; and a casing made of glass and housing the light-emitting part and the sealing parts, a pair of electrode rods are disposed within the casing such that (i) tips of the electrode rods face each other with a gap therebetween and project into the discharge space, (ii) a base end of each electrode rod is embedded in a corresponding one of the sealing parts, and (iii) the base end of each electrode rod overlaps, and is thus in contact with, a surface of a corresponding one of metal foils respectively provided in the sealing parts, the base end of each electrode rod is coated with a coating foil that is made of metal and has a C-like cross section with a slit formed between edges thereof, an end of the coating foil farthest from the light-emitting part is located closer to the light-emitting part than an end of the metal foil closest to the light-emitting part, and in a cross-sectional view of each electrode rod along a perpendicular plane to a central axis thereof, an outer circumference of the coating foil has two intersection points with the surface of the metal foil on which a point of contact with the electrode rod exists, and the slit of the coating foil is located outside an area between straight lines connecting a center point of the electrode rod with the intersection points.

In the cross-sectional view, an angle θ1 of the slit may satisfy 5°<θ1<180°, where the angle θ1 is defined as an angle formed between two straight lines connecting the center point with the edges of the coating foil.

In the cross-sectional view, the slit may be located such that the two straight lines connecting the center point with the edges of the coating foil have no intersection point with the surface of the metal foil.

Each electrode rod may have a diameter equal to or greater than 0.45 mm.

The high-pressure discharge lamp may have a power rating equal to or greater than 300 W.

In another aspect, the techniques disclosed here feature a lamp unit comprising: the high-pressure discharge lamp defined above; and a reflection mirror having a concave reflection surface, wherein the reflection mirror is attached to the high-pressure discharge lamp so that the reflection surface reflects light emitted by the high-pressure discharge lamp.

In yet another aspect, the techniques disclosed here feature a projector-type image display apparatus, comprising: the lamp unit defined above; an optical unit that modulates illuminating light from the lamp unit to form an optical image; and a projection device that magnifies and projects the optical image.

In the stated structures, an end of the coating foil farthest from the light-emitting part is located closer to the light-emitting part than an end of the metal foil closest to the light-emitting part. These structures reduce in size the space surrounded by the electrode rod, the metal foil and the casing made of glass. This increases the degree of contact between the electrode rod, the metal foil and the casing. Therefore, the stated structures realize a high-pressure discharge lamp that prevents the breakage of the casing of the sealing part.

These general and specific aspects may be implemented using a manufacturing method.

These and other objects, advantages, and features of the invention will become apparent from the following description thereof taken in conjunction with the accompanying drawings, which illustrate specific embodiments of the present invention.

Additional benefits and advantages of the disclosed embodiments will be apparent from the specification and figures. The benefits and/or advantages may be individually provided by the various embodiments and features of the specification and drawings disclosed, and need not all be provided in order to obtain one or more of the same.

BRIEF DESCRIPTION OF DRAWINGS

FIG. 9 shows, for each of the comparative example and the lamp pertaining to the present disclosure, the occurrence ratios of breakage of the sealing part when the total lighting time reaches 100 hours and 2000 hours.

DETAILED DESCRIPTION

Circumstances Leading to Embodiments

Figure 1:
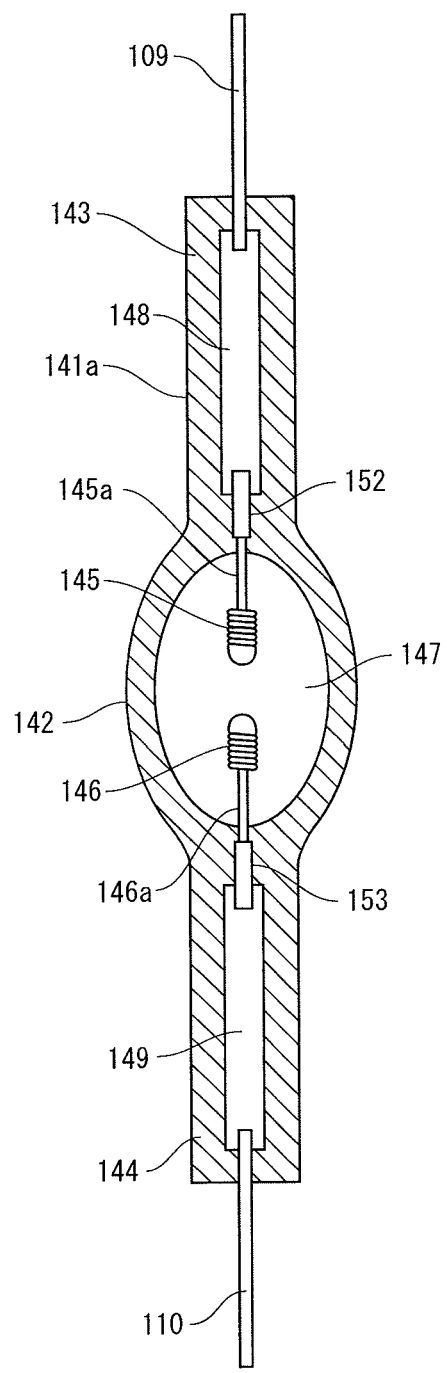
FIG. 1 is a frontal cross-sectional view showing a structure of an arc tube of a conventional high-pressure mercury lamp.

Before specifically describing Embodiments of the present invention, the following explains the circumstances leading to Embodiments.

For the sake of safety, it is desired to prevent breakage of the casing of a high-pressure discharge lamp. From such a viewpoint, the inventors of the present invention manufactured test lamps with various structures, and evaluated the damage to the casing. Specifically, when the inventors manufactured and lit up the high-pressure discharge lamp with the structure disclosed in Japanese Patent Application Publication No. 2001-189149, the joint part between the base end of the electrode rod and the metal foil got broken. Presumably this is because the joint part between the base end of the electrode and the metal foil is not in close contact with the casing made of glass. With such a structure, it can be assumed that the heat generated in the joint part during the lighting of the high-pressure discharge lamp does not easily diffuse from the glass casing. That is, the inventors figured out that the joint part between the base end of the electrode rod and the metal foil should be in close contact with the glass casing for the sake of thermal diffusion. The inventors also manufactured and tested a high-pressure discharge lamp with the structure disclosed in Japanese Patent Application Publication No. 2004-39349. However, due to the close contact between the electrode rod and the tubular member made of glass, a crack easily occurred and the casing got broken at the crack. Even when a coil was wound around the electrode to prevent the occurrence of a crack, a small crack still occurred around the coil, and the casing got broken. A countermeasure for such a crack is disclosed in Japanese Patent Application Publication No. 2010-129426, Japanese Patent Application Publication No. 2009-43701 and Japanese Patent Application Publication No. 2009-152165.

In the meantime, high-pressure discharge lamps have been commonly used as light sources for lighting fixtures and projector-type image display apparatuses in recent years, and have been desired to achieve higher output. For higher output, if the power rating of the high-pressure discharge lamp is increased (e.g. no less than 300 W), the diameter of the electrode rod included in the electrode accordingly increases (e.g. no less than 0.45 mm). The inventors focused on the fact that a large diameter of the electrode rod possibly causes breakage of the glass casing at the sealing part, and took countermeasures disclosed in Japanese Patent Application Publication No. 2010-129426, Japanese Patent Application Publication No. 2001-189149, Japanese Patent Application Publication No. 2004-39349, Japanese Patent Application Publication No. 2009-43701 and Japanese Patent Application Publication No. 2009-152165. However, although some degree of improvement was achieved, the inventors could not completely remove the problem by such countermeasures.

The inventors further sought factors leading to the breakage, and found that the breakage is caused due to a large space near the joint part between the base end of the electrode rod and the metal foil, surrounded by the casing, the electrode rod and the metal foil. Such a large space results from a large substantive diameter of the electrode rod. Specifically, when the space is large, the degree of contact between the metal foil and the casing is low. Therefore, the mercury or the like easily enters the space. When bumping of the mercury or the like occurs due to the heat generated during the lighting of the high-pressure discharge lamp, the casing is subject to pressure. Thus, the breakage of the casing is likely to occur when the space is large and the degree of the contact between the metal foil and the casing is low. This breakage occurs when the substantive diameter of the electrode rod reaches a certain length. Here, the term "the substantive diameter" of the electrode rod means the diameter of the electrode rod including the thickness of the coating foil when the electrode rod is coated with the coating foil, and otherwise means the diameter of the electrode rod alone.

Considering the above, the inventors conceived of a structure of a high-pressure discharge lamp in which the end of the coating foil that is further from the light-emitting part is located closer to the light-emitting part than the end of the metal foil that is closer to the light-emitting part is. With such a structure, even when an electrode rod with a large diameter is used for achieving a large power rating, the substantive diameter of the electrode rod is reduced by the thickness of the coating foil at the joint part between the electrode rod and the metal foil. The inventors found that such a structure is effective for preventing breakage of the casing of the sealing part.

[Embodiments]

<<Embodiment 1>>

The following explains Embodiment 1 in detail with reference to the drawings.

Note that the materials and the values used in the following description of the embodiments of the present invention are only preferable examples, and the present invention is not limited to the embodiments. The materials and the values can be changed unless such changes depart from the scope of the present invention. Also, the embodiments may be combined together as long as they will not be contradictory when combined. Also note that the components shown in the drawings including FIG. 2 and FIG. 3 are not drawn to the same scale.

1. Overall Structure

Figure 2:
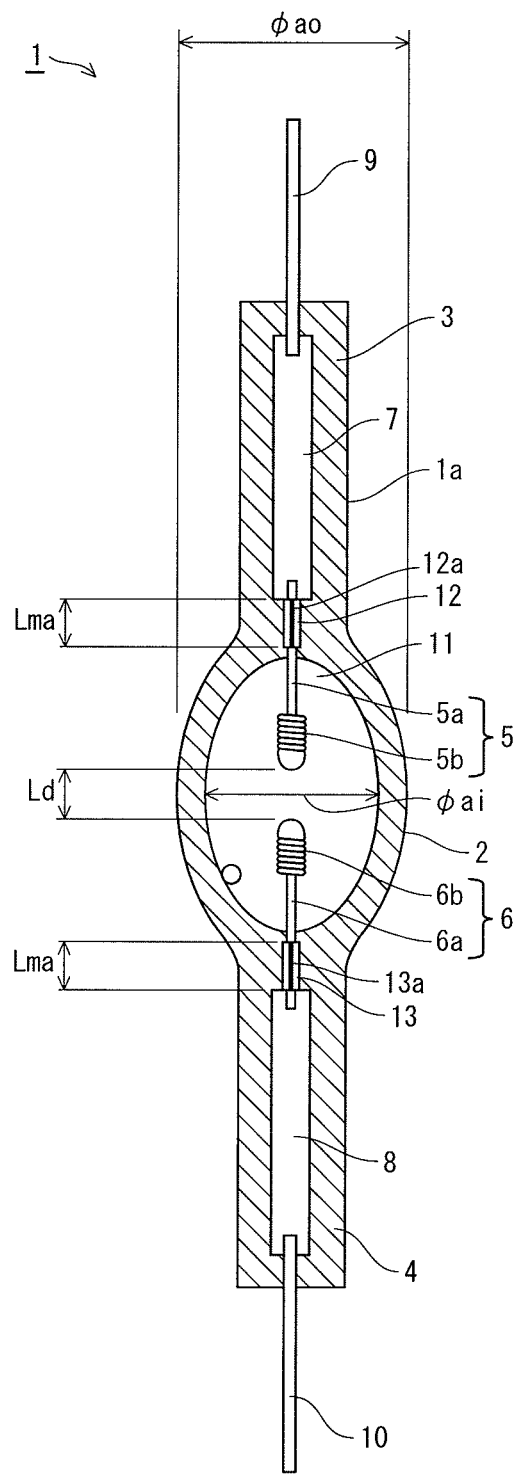
FIG. 2 is a frontal cross-sectional view showing a structure of an arc tube of a high-pressure mercury lamp as an Embodiment 1 of the present invention.
Figure 3:
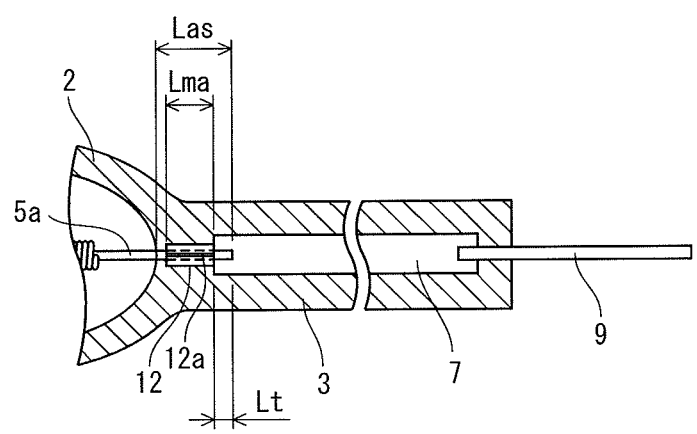
FIG. 3 is an enlarged view of a part of the cross section of the arc tube shown in FIG. 2.

FIG. 2 is a frontal cross-sectional view showing a structure of an arc tube of a high-pressure mercury lamp as an Embodiment 1 of the present invention. FIG. 3 is an enlarged view of a part of the cross-sectional view of the arc tube shown in FIG. 2.

As shown in FIG. 2, the arc tube 1 of the high-pressure mercury lamp includes a casing 1a made of glass and a pair of electrodes 5 and 6 located within the casing 1a. The arc tube 1 has a light-emitting part 2 within which a discharge space is formed and sealing parts 3 and 4 connected to the light-emitting part 2. The electrodes 5 and 6 respectively have electrode rods 5a and 6a whose respective ends overlap, and are thus in contact with, metal foils 7 and 8. The electrode rods 5a and 6a are respectively fitted into coating foils 12 and 13 each made of metal and having a C-like curving cross section. Here, the term "C-like" means that the cross section of each of the coating foils 12 and 13 along the vertical direction in the drawing has a shape similar to the character "C". In other words, the coating foils 12 and 13 have a sleeve-like shape with slits 12a and 13a, respectively.

More specifically, in the arc tube 1, the coating foils 12 and 13 are disposed such that their respective ends farthest from the light-emitting part 2 are located closer to the light-emitting part 2 than the ends of the metal foils 7 and 8 closest to the light-emitting part 2. The coating foils 12 and 13 are fitted onto the electrode rods 5a and 6a (i.e. each electrode rod is inserted in a coating foil). The metal foils 7 and 8, the coating foils 12 and 13, and the electrode rods 5a and 6a are housed in the casing 1a made of glass. Note that the power rating of the high-pressure mercury lamp is no less than 300 W. For example, the power rating is 350 W. The following describes each of the components shown in FIG. 2 and FIG. 3.

2. Structure of Each Component

<Arc Tube 1, Light-emitting Part 2, Sealing Parts 3 and 4>

The arc tube 1 includes the casing 1a made of fused quartz glass, for example, and the pair of electrodes 5 and 6 located within the casing 1a. The arc tube 1 has the light-emitting part 2 and the sealing parts 3 and 4. The light-emitting part 2 is located in the middle of the arc tube 1 and has a substantially spheroidal shape. The sealing parts 3 and 4 are connected to the ends of the light-emitting part 2 and each has a substantially columnar shape. The arc tube 1 encloses predetermined amounts of: mercury (Hg) as a light-emitting material; argon gas (Ar) for example, which is a noble gas serving as a starting material; and bromine (Br) for example, which is used for halogen cycle. The sealing parts 3 and 4 are sealed by a well-known shrink sealing method.

For example, the inside diameter $\phi ai$ of the central portion of the light-emitting part 2 is 5.4 mm, and the outside diameter $\phi ao$ of the same is 11.6 mm. The internal volume of the light-emitting part 2 of the present embodiment is 0.12 cc. The amount of the enclosed mercury falls within the range from 0.2 mg/mm$^3$ to 0.35 mg/mm$^3$, and for example it is 0.3 mg/mm$^3$. The amount of the enclosed argon gas is for example 30 kPa (25° C.). The amount of the enclosed bromine is for example 0.5×10$^{-3}$ μmol.

<Electrodes 5 and 6, Discharge Space 11>

The discharge space 11 is formed inside the light-emitting part 2. In the discharge space 11, the pair of electrodes 5 and 6 are disposed so that their respective tips face each other. The electrodes 5 and 6 are made of tungsten (W) for example. The arc length Ld of the electrodes 5 and 6 falls within the range from 0.5 mm to 2.0 mm, and for example it is 1.2 mm.

The base ends of the electrodes 5 and 6 are embedded in the sealing parts 3 and 4. The base ends of the electrode 5 and 6 overlap, and are thus in contact with, the metal foils 7 and 8 which are rectangular strips located in the sealing parts 3 and 4. The base ends of the electrodes 5 and 6 are connected to the respective ends of the external lead wires 9 and 10 via the metal foils 7 and 8. The tips of the electrodes 5 and 6 project into the discharge space 11.

The electrodes 5 and 6 have the electrode rods 5a and 6a and electrode coils 5b and 6b. The base ends of the electrode rods 5a and 6a are connected to the metal foils 7 and 8 by welding for example, and the tips of the electrode rods 5a and 6a are located within the discharge space 11. The electrode coils 5b and 6b are attached to the tips of the electrode rods 5a and 6a. The electrode rods 5a and 6a have a substantially columnar shape with a substantially circular cross section, for example. The diameter of the electrode rods 5a and 6a is 0.525 mm for example, and the coil wire diameter of the electrode coils 5b and 6b is 0.300 mm, for example.

Note that the term "tips" of the electrode rods 5a and 6a means the portions of the electrode rods 5a and 6a that are in contact with the electrode coils 5b and 6b and the vicinities of the portions. Note that each electrode rod and its electrode coil may be fused and integrated into one piece. If this is the case, the tip of the electrode rod means the tip of the electrode. The base ends of the electrode rods 5a and 6a correspond to the portions of the electrode rods 5a and 6a having a length Lt shown in FIG. 3. The portions of the electrode rods 5a and 6a located inside the sealing parts 3 and 4 are specifically the portions having a length Las shown in FIG. 3.

<Metal Foils 7 and 8>

The metal foils 7 and 8, each having a rectangular strip-like shape, are sealed in the sealing parts 3 and 4. The metal foils 7 and 8 are made of molybdenum (Mo) for example, and have a thickness of 20 μm and a width of 1.50 mm. Here, as shown in FIG. 3, the electrode rod 5a and the metal foil 7 are connected by welding. Specifically, one end of the electrode rod 5a overlaps, and is welded to, the metal foil 7. The length of the overlapping portion falls within the range from 1.0 mm to 1.5 mm, and it is approximately 1.2 mm, for example. Note that the overlapping portion, where the electrode rod 5a and the metal foil 7 overlap each other, is the portion having the length Lt shown in FIG. 3.

<External Lead Wires 9 and 10>

As shown in FIG. 2, the external lead wires 9 and 10 are respectively connected to the metal foils 7 and 8. The external lead wires 9 and 10 are made of tungsten, for example. Ends of the external lead wires 9 and 10 are connected to the metal foils 7 and 8. The opposite ends of the external lead wires 9 and 10 project outward from the end surfaces of the sealing parts 3 and 4, and they are connected to a power supply line, base or the like not depicted in the drawing.

<Coating Foils 12 and 13>

The electrode rods 5a and 6a are partially coated with the coating foils 12 and 13. Specifically, the portions of the electrode rods 5a and 6a having a length Las shown in FIG. 3 (i.e. at least part of the portions located inside the sealing parts 3 and 4) are fitted into the coating foils 12 and 13 which are made of metal and have a sleeve-like shape. The coating foils 12 and 13 have the slits 12a and 13a. The coating foils 12 and 13 are made of molybdenum for example, and have a thickness of 20 μm, for example. The length Lma of the coating foils 12 and 13 is 2.0 mm. The angle θ1 of the slits 12a and 13a can be selected within the range defined by 5°<θ1<180°, and it is 10° for example. Detailed description of "the angle θ1 of the slits 12a and 13a" will be given later with reference to FIG. 6.

3. Electrode Rods, Metal Foil and Connection of Coating Foils

The following describes in detail the electrode rod 5a, the metal foil 7 and the connection of the coating foil 12. Note that the same description applies to the electrode rod 6a, the metal foil 8 and the coating foil 13.

Figure 4:
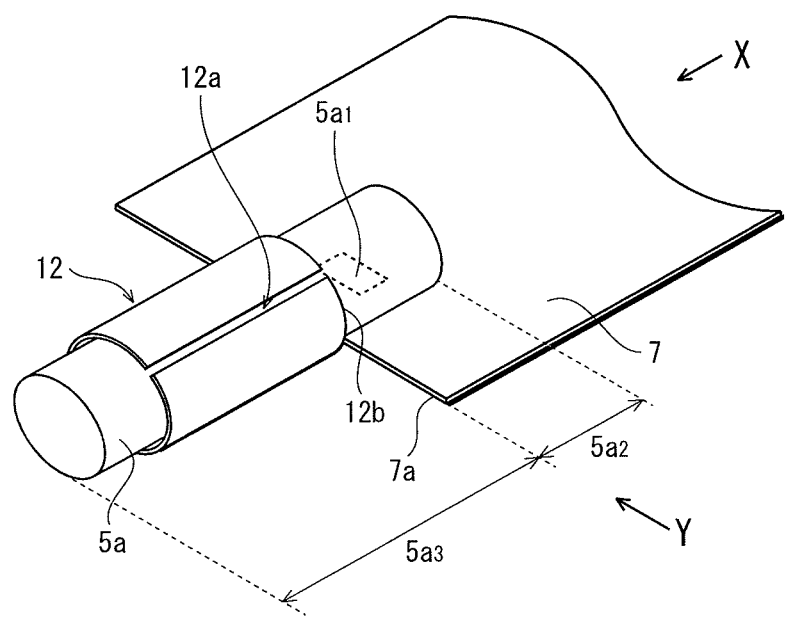
FIG. 4 is an enlarged perspective view of the vicinity of the joint part between an electrode rod and a metal foil of the arc tube shown in FIG. 2.
Figure 5:
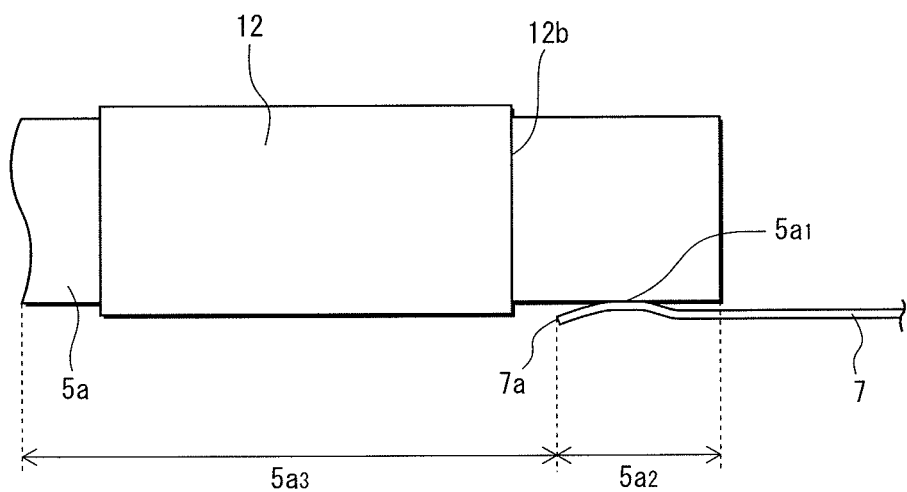
FIG. 5 is a side view of the vicinity of the joint part between the electrode rod and the metal foil of the arc tube shown in FIG. 2.

FIG. 4 is an enlarged perspective view of the vicinity of the joint between the electrode rod and the metal foil of the arc tube shown in FIG. 2. FIG. 5 is a side view of the vicinity of the joint part between the electrode rod and the metal foil of the arc tube shown in FIG. 2, and corresponds to FIG. 4 seen in the Y direction. The casing made of glass is hot shown in FIG. 4 and FIG. 5. The light-emitting part 2 is located to the bottom left of the sheet of FIG. 4, and to the left of the sheet of FIG. 5.

As shown in FIG. 4 and FIG. 5, the electrode rod 5a and the metal foil 7 are connected by welding at a welding point 5a1 of the electrode rod. Also, as described above, the coating foil 12 is fitted onto the portion of the electrode rod 5a located within the sealing part 3. Furthermore, the coating foil 12 is disposed such that an end 12b of the coating foil 12, which is farther from the light-emitting part 2 than the other end thereof, is closer to the light-emitting part 2 than an end 7a of the metal foil 7, which is closer to the light-emitting part 2 than the other end thereof. In other words, the coating foil 12 does not coat the joint part 5a2 of the electrode rod connected to the metal foil 7, and coats at least part of a non joint part 5a3 of the electrode rod 5a, where is the part of the electrode rod 5a other than the joint part 5a2. Note that the term "the joint part 5a2 of the electrode" means the part of the electrode rod 5a that runs on (i.e. overlaps) the metal foil 7. Also, the term "the non-joint part 5a3 of the electrode" means the part of the electrode rod 5a that does not run on (i.e. does not overlap) the metal foil 7.

The slit 12a of the coating foil 12 is located such that the metal foil 7 and the coating foil 12 come into contact with each other and are thus fixed. For example, the slit 12a and the welding point 5a1 are located diametrically opposite with respect to the center point 5o of the electrode rod 5a. Further details of the location of the slit 12a of the coating foil 12 will be described later.

4. Angle of Slit of Coating Foil

Figure 6:
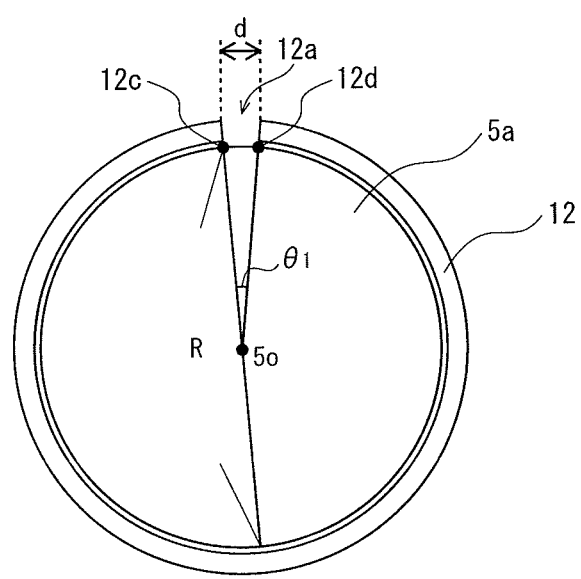
FIG. 6 shows the electrode rod shown in FIG. 4 seen in the X direction shown in FIG. 4.

The following describes the angle of the slit 12a of the coating foil 12. Note that the same description applies to the slit 13a of the coating foil 13. FIG. 6 shows the electrode rod shown in FIG. 4 seen in the X direction shown in FIG. 4, from which the metal foil 7 has been removed. In other words, FIG. 6 shows cross sections of the electrode rod 5a and the coating foil 12. The angle θ1 of the slit 12a is formed by points 12c and 12d and the center point 5o of the electrode rod 5a. Note that the points 12c and 12d are the intersection points of the two edges of the coating foil 12, between which the slit 12a is formed, with the inner circumference of the coating foil 12. The angle θ1 of the slit 12a can be obtained as follows. First, draw the line connecting the point 12c with the center point 5o of the electrode rod 5a. Here, the point 12c is a point on one of the edges of the coating foil 12 between which the slit 12a is formed. Then, draw the line connecting the point 12d with the center point 5o of the electrode rod 5a. The point 12d is a point on the other edge of the coating foil 12. The angle formed by these two lines is defined as the angle θ1 of the slit 12a. The diameter R of the electrode rod 5a, the distance d between the two edges of the coating foil 12 between which the slit 12a is formed, and the angle θ1 of the slit 12a satisfy the relationship represented by the following Formula 1:

$$d = R \sin(\theta 1/2) \quad \text{(Formula 1)}$$

The angle θ1 of the slit of the metal foil 7 can be obtained by conducting measurement on the electrode rod 5a coated with the coating foil 12 by using an X-ray CT scanner or the like. Alternatively, the slit angle θ1 can be obtained by measuring the diameter R of the electrode rod 5a and the distance d between the edges of the coating foil 12, and then substituting them into Formula 1.

As described above, the slit angle θ1 can be selected within the range of 5°<θ1<180°. This range of the slit angle θ1 is determined for the following reasons. The lower limit of the slit angle θ1 is determined as above because there is a possibility that no slit is formed due to manufacturing error when the angle θ1 is set to be no greater than 5°. On the other hand, the upper limit of the slit angle θ1 is determined as above because it could be difficult to form the coating foil 12 to cover the electrode rod 5a when the slit angle θ1 is set to be equal to or greater than 180°.

5. Effects

The following shows an overview of the advantageous effects of the present disclosure and explains the results of demonstration experiments conducted to verify the effects.

<Overview of Effects>

Figure 7A:
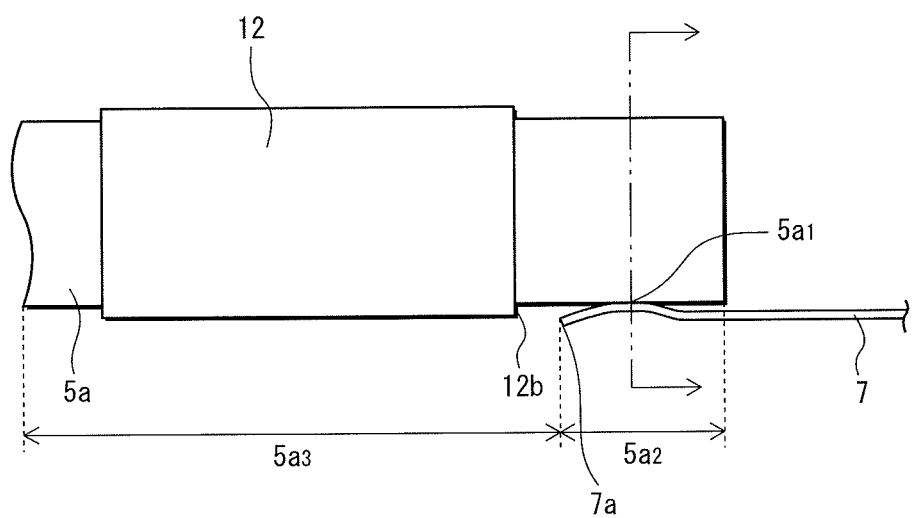
FIG. 7A is a side view of the vicinity of the joint part between the electrode rod and the metal foil of the arc tube shown in FIG. 2.
Figure 7B:
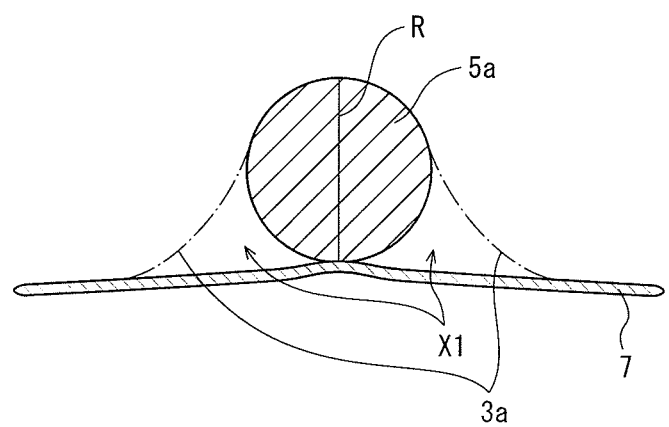
FIG. 7B is a cross-sectional view of the vicinity of the joint part between the electrode rod and the metal foil of the arc tube shown in FIG. 2.
Figure 7C:
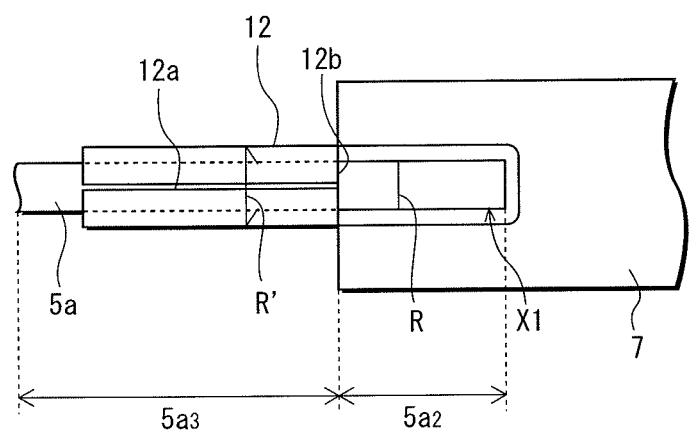
FIG. 7C is a top view of the vicinity of the joint between the electrode rod and the metal foil of the arc tube shown in FIG. 2.
Figure 8A:
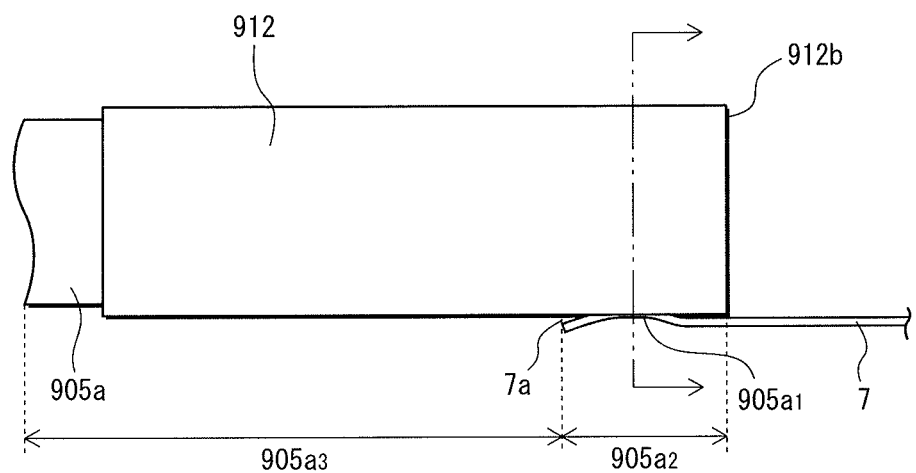
FIG. 8A is a side view of the vicinity of the joint between an electrode rod and a metal foil of an arc tube pertaining to a comparative example.
Figure 8B:
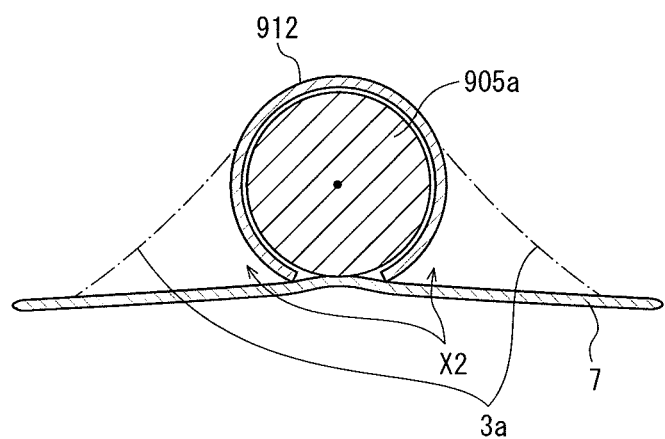
FIG. 8B is a cross-sectional view of the vicinity of the joint between the electrode rod and the metal foil of the arc tube pertaining to the comparative example.
Figure 8C:
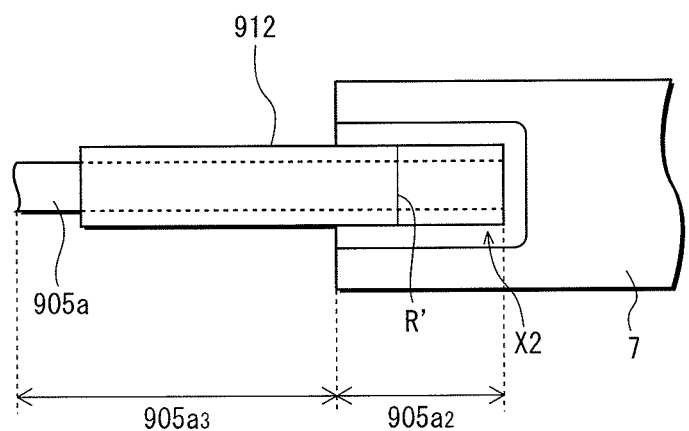
FIG. 8C is a top view of the vicinity of the joint between the electrode rod and the metal foil of the arc tube pertaining to the comparative example.

First, the following summarizes the advantageous effects of the present disclosure, with reference to FIG. 7 and FIG. 8. FIGS. 7A through 7C correspond to FIG. 2 which shows the arc tube pertaining to the present disclosure shown in FIG. 2, and FIGS. 8A through 8C show an arc tube pertaining to a comparative example. FIG. 7A and FIG. 8A are side views of the vicinity of the joint part between the electrode rod and the metal foil of the arc tube. FIG. 7B and FIG. 8B are cross-sectional views of the vicinity of the joint part between the electrode rod and the metal foil of the arc tube. FIG. 7C and FIG. 8C are top views of the vicinity of the joint part between the electrode rod and the metal foil of the arc tube. In FIG. 7A and FIG. 8A, the glass casing is not depicted as glass is transparent, and it is assumed that the light-emitting part is located to the left of the sheets of the drawings. In FIG. 7B and FIG. 8B, a dashed-dotted line 3 represents the inner surface of the glass casing 1a of the sealing part 3. In FIG. 7C and FIG. 8C, it is assumed that the light-emitting part is located to the left of the sheet of the drawing.

As shown in FIG. 7A, in the arc tube pertaining to the present disclosure, the end 12b of the coating foil 12, which is farther from the light-emitting part 2 than the other end of the coating foil 12, is located closer to the light-emitting part 2 than the end 7a of the metal foil 7 is. The end 7a of the metal foil 7 is closer to the light-emitting part 2 than the other end of the metal foil 7 is. The coating foil 12 is fitted onto the electrode rod 5a. Therefore, as shown in FIG. 7B, a space X1 is formed by the electrode rod 5a, the metal foil 7 and the inner surface 3a of the casing 1a. Here, the volume of the space X1 is determined by the substantive diameter R of the electrode rod 5a. The diameter R of the electrode rod 5a is 0.525 mm, for example.

On the other hand, in the arc tube pertaining to the comparative example as shown in FIG. 8A, the end 912b of the coating foil 912 is farther from the light-emitting part 2 than the end 7a of the metal foil 7 is. The end 7a of the metal foil 7 is closer to the electrode 5 than the other end of the metal foil 7 is. The coating foil 912 is fitted onto the electrode rod 5a. Therefore, as shown in FIG. 8B, a space X2 is formed by the electrode rod 905a coated with the coating foil 912, the metal foil 7, and the inner surface 3a of the casing 1a. Here, the volume of the space X2 is determined by the substantive diameter R' of the electrode rod 905a coated with the coating foil 912. Since the coating foil 912 has a thickness of 20 μm, R' is 0.565 mm.

Under such conditions, the volume of the space X1 is 0.9 times the volume of the space X2, for example. Thus, the space X1 of the arc tube pertaining to the present disclosure is smaller than the space X2 of the arc tube pertaining to the comparative example. Here, in the sealing part, the degree of contact between the electrode rod 5a and the casing 1a increases as the space X1 or X2 decreases in volume. When the space is small and the degree of contact is large, the casing 1a is unlikely to break even if mercury or the like enters the space and bumping of the mercury occurs due to the heat generated by the high-pressure mercury lamp when lit up. From the comparison between the arc tube pertaining to the present disclosure and the arc tube pertaining to the comparative example, it can be seen that the effect against the breakage of the casing 1a is notable when the diameter of the electrode rod is no less than 0.45 mm.

As described above, in the arc tube 1 pertaining to the present disclosure, the degree of contact between the electrode rod 5a and the casing 1a of the sealing part 3 is large. Therefore, it can be said that the present disclosure is effective for preventing the breakage of the casing 1a of the sealing part 3.

<Experiments for Demonstrating the Effects>

Next, the experiments conducted for evaluating the above-described effects and the results of the experiments will be explained.

The experiments were conducted on a given number of samples of each of the high-pressure mercury lamp with the arc tube pertaining to the present disclosure as shown in FIG. 7 and the high-pressure mercury lamp with the arc tube pertaining to the comparative example as shown in FIG. 8.

FIG. 9 shows the test results. Specifically, FIG. 9 shows, for each of the comparative example and the lamp pertaining to the present disclosure, the occurrence ratios of breakage of the sealing part when the total lighting time reaches 100 hours (i.e. breakage in the aging process in the manufacturing) and 2000 hours (i.e. breakage in the middle of the lifespan). The comparative example has the structure shown in FIGS. 8A through 8C. The end of the coating foil that is farthest from the light-emitting part corresponds in position to the end of the metal foil that is closest to the light-emitting part, and the coating foil is fitted onto the electrode rod. The arc tube pertaining to the present disclosure has the structure shown in FIGS. 7A through 7C. The end of the coating foil farthest from the light-emitting part is located closer to the light-emitting part than the end of the metal foil that is closest to the light-emitting part, and the coating foil is fitted onto the electrode rod.

As shown in FIG. 9, with the structure of the lamp pertaining to the present disclosure, the occurrence ratio of the breakage in the aging process in the manufacturing dropped from 1.03% to 0.00%. Also, the occurrence ratio of the breakage after the screening dropped from 0.52% to 0.00%. The inventors found that the structure of the arc tube 1 pertaining to the present disclosure is effective for preventing breakage of the casing 1a of the sealing part 3.

6. Function of Slit

<Overview>

From the results of the experiments, the inventors found that when the ends of the coating foil wound around the electrode rod overlap each other as with the structures pertaining to Patent Literatures 4 and 5, a crack is likely to occur in the overlapping portion. Considering this finding, the inventors examined the mechanism of the occurrence of a crack in the overlapping portion. The following explains the function of the slit 12a provided in the coating foil 12 according to the examination, with reference to FIG. 10.

<Examination and Summary>

Figure 10A:
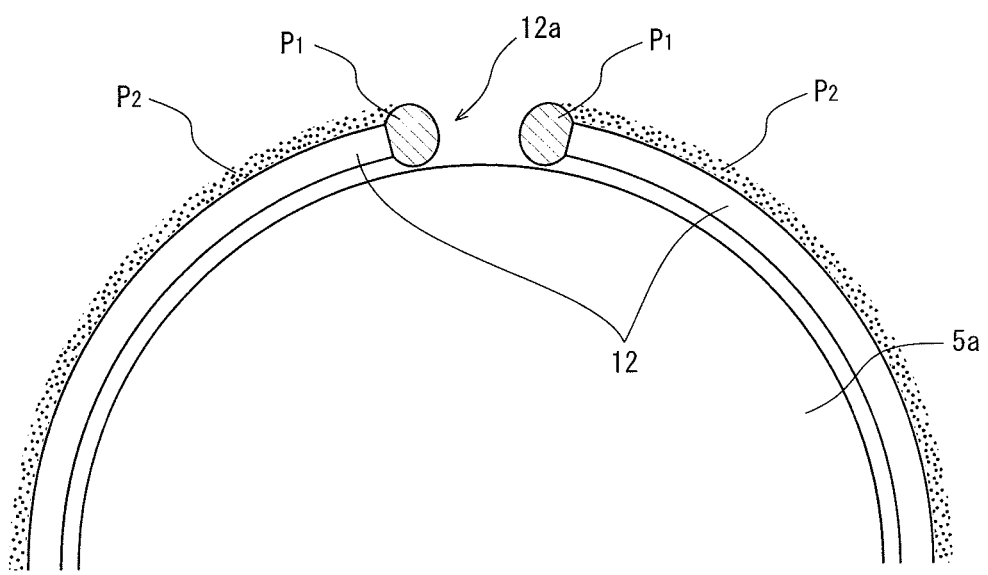
FIG. 10A is a drawing used for explaining the function of the slit of the coating foil for the arc tube shown in FIG. 2 based on the case of the present disclosure.
Figure 10B:
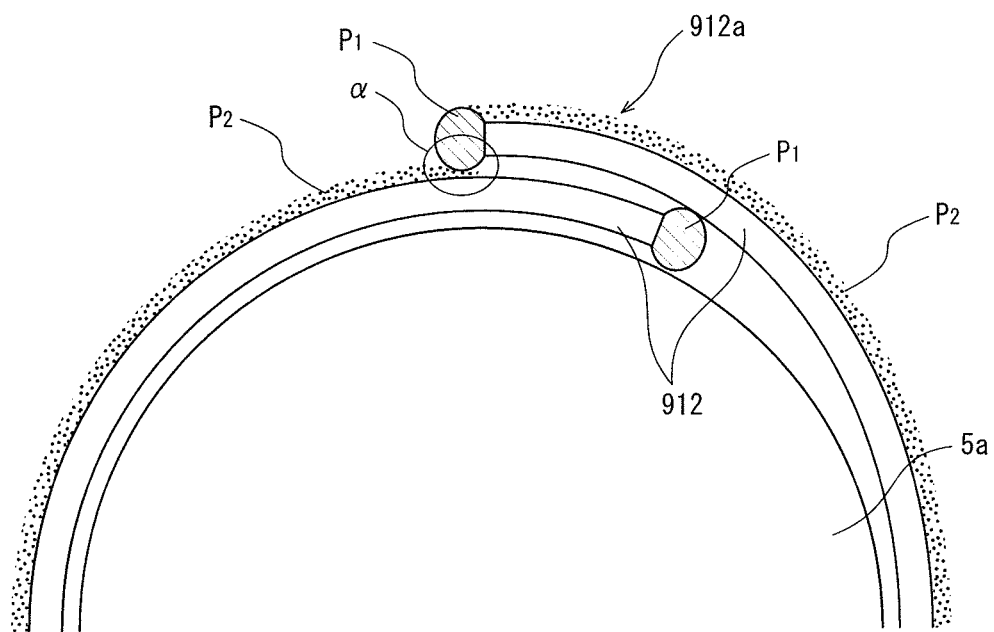
FIG. 10B is a drawing used for explaining the function of the slit of the coating foil for the arc tube shown in FIG. 2 based on the case of the conventional example.

FIG. 10A is an enlarged view of the vicinity of the slit provided in the coating foil of the arc tube shown in FIG. 2, and FIG. 10B is an enlarged view of the vicinity of the overlapping portion of the coating foil of the arc tube pertaining to the comparative example. Although not depicted in FIG. 10A and FIG. 10B, the glass exists around the electrode rod coated with the coating foil. The coating foil 12 of the arc tube pertaining to the present disclosure is provided with the slit 12a. The coating foil 912 of the arc tube pertaining to the comparative example is provided with no slit, and has an overlapping portion 912a.

Generally, when a cylindrical metal thin film wound around the metal rod is sealed with glass, mainly two kinds of stress occur. The first stress is the stress occurring at the border between the glass and the ends of the metal thin film. The second stress is the stress occurring at the border between the glass and the metal thin film. Since the ends of a metal thin film are more distorted than the middle thereof, the first stress is greater than the second stress.

Considering the two types of stress, in the coating foil 12 provided with the slit 12a, the first stress P1 and the second stress P2 occur at separate locations as shown in FIG. 10A. On the other hand, in the case of the coating foil 912 not provided with the slit 12a and having the overlapping portion, the first stress P1 and the second stress P2 occur in the area a, which is a part of the overlapping portion. It is expected that the force applied to the glass casing 1a when the first stress P1 and the second stress P2 are applied to the same area.

As described above, due to the slit 12a provided in the coating foil 12, the first stress P1 and the second stress P2 are prevented from being applied to the same area. Thus, the slit 12a is effective for preventing the breakage of the glass casing 1a caused by a large force applied to the border between the coating foil 12 and the glass casing 1a.

7. Manufacturing Method

The following explains the process of fitting the electrode rod 5a, the metal foil 7 and the coating foil 12 together. This is a primary process of a method of manufacturing the arc tube pertaining to the present disclosure. FIG. 11A through 11D show the process of connecting the metal foil and the electrode rod of the arc tube shown in FIG. 2.

Figure 11A:
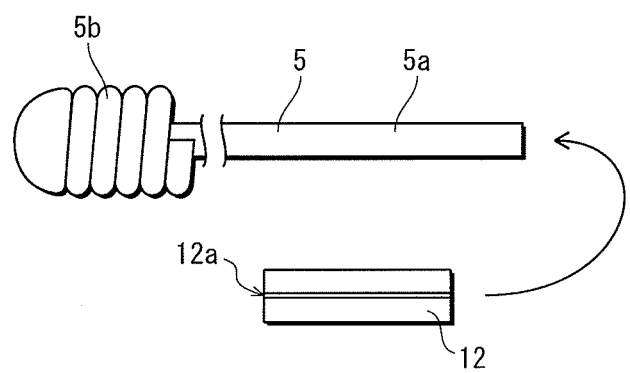
FIG. 11A shows a part of a process of connecting the metal foil and the electrode rod of the arc tube shown in FIG. 2, and specifically shows a step of fitting the coating foil to the electrode rod.
Figure 11B:
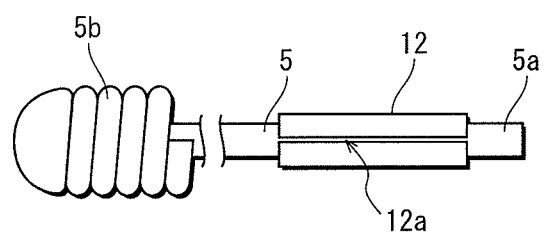
FIG. 11B shows a part of the process of connecting the metal foil and the electrode rod of the arc tube shown in FIG. 2, and specifically shows the electrode rod coated with the coating foil.

First, as shown in FIG. 11A, the coating foil 12 having a sleeve-like shape is fitted onto the electrode rod 5a of the electrode 5 from the end of the electrode rod 5a that is farthest from the electrode coil 5b. As a result, the electrode rod 5a is coated with the coating foil 12 as shown in FIG. 11B.

Figure 11C:
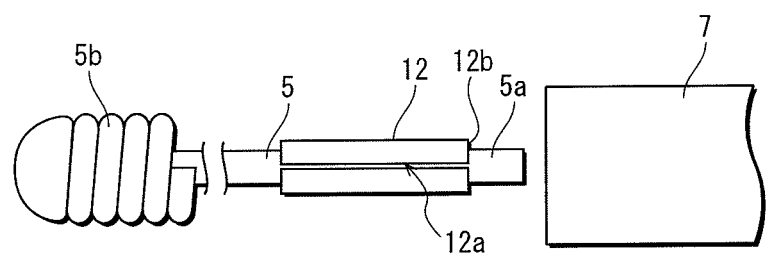
FIG. 11C shows a part of the process of connecting the metal foil and the electrode rod of the arc tube shown in FIG. 2, and specifically shows a step of positioning the metal foil to be connected with the electrode rod coated with the coating foil.

Next, as shown in FIG. 11C, the electrode rod 5a coated with the coating foil 12 is positioned on, and welded to, the metal foil 7 having a rectangular shape. Then the coating foil 12 is positioned. Here, the positions of the electrode rod 5a and the metal foil 7 are determined by the end 12b of the coating foil 12 coming into contact with the metal foil 7. The electrode rod 5a and the coating foil 12 may be welded together.

Figure 11D:
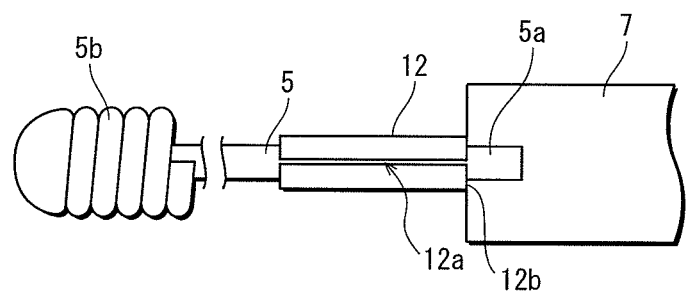
FIG. 11D shows a part of the process of connecting the metal foil and the electrode rod of the arc tube shown in FIG. 2, and specifically shows the electrode rod, the metal foil and the coating foil at the completion of the process.

By the above-described process, the electrode rod 5a, the metal foil 7 and the coating foil 12 are fitted together as shown in FIG. 11D.

8. Location of Slit

The following describes the location of the slit 12a provided in the coating foil 12 with reference to the specific examples shown in FIGS. 12A and 12B and FIGS. 13A and 13B. This is followed by the explanation of the conditions for the location of the slit.

<Specific Examples>

Figure 12A:
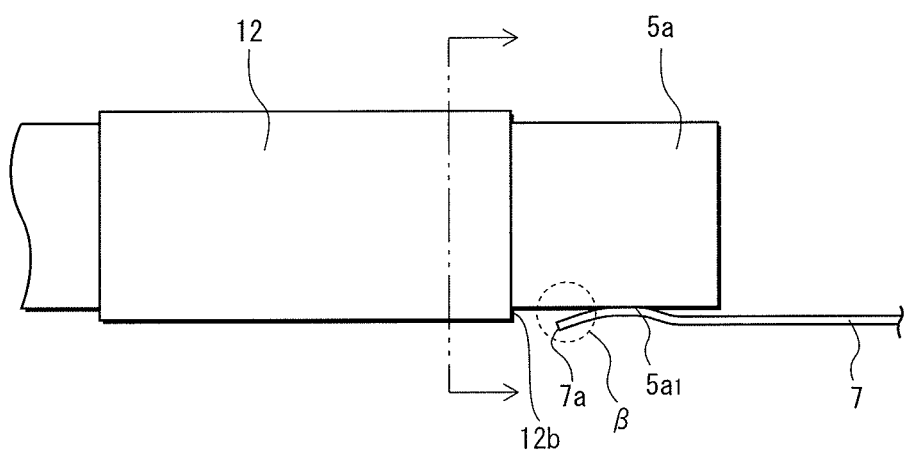
FIG. 12A is a side view used for explaining the orientation of a slit provided in a coating foil of an arc tube pertaining to a comparative example.
Figure 12B:
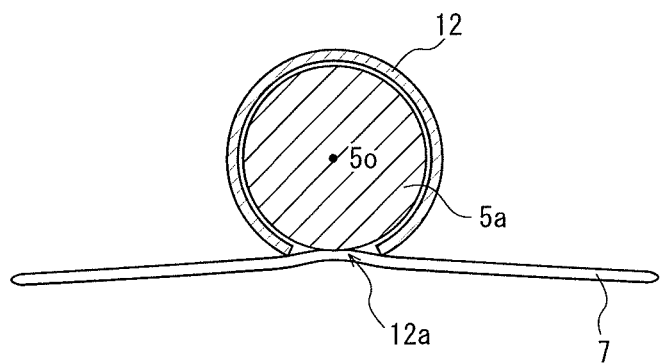
FIG. 12B is a cross-sectional view used for explaining the orientation of the slit provided in the coating foil of the arc tube pertaining to the comparative example.
Figure 13A:
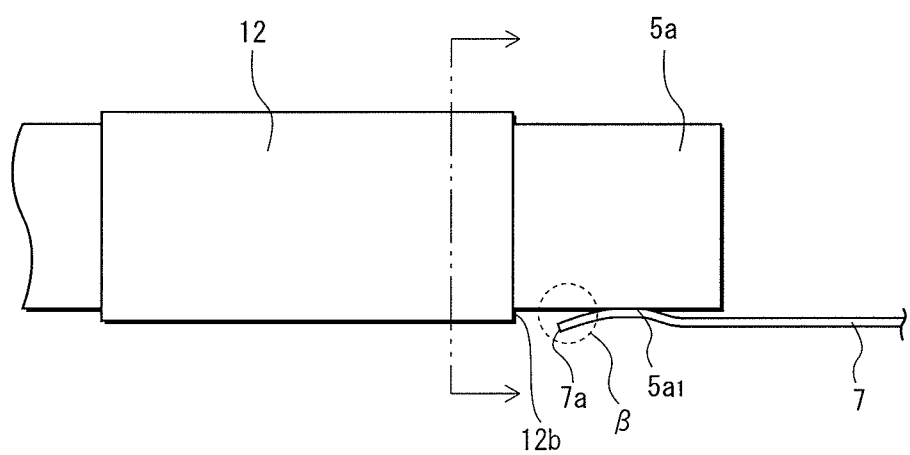
FIG. 13A is a side view used for explaining the orientation of the slit provided in the coating foil of the arc tube shown in FIG. 2.
Figure 13B:
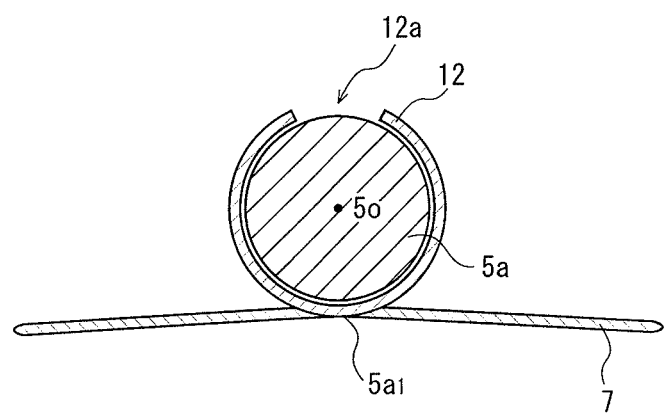
FIG. 13B is a cross-sectional view used for explaining the orientation of the slit provided in the coating foil of the arc tube shown in FIG. 2.

FIG. 12A and FIG. 12B are drawing for explaining the location of the slit provided in the coating foil of the arc tube pertaining to the comparative example. FIG. 12A is a side view, and FIG. 12B is a cross-sectional view corresponding to FIG. 12A. FIG. 13A and FIG. 13B are drawing for explaining the location of the slit provided in the coating foil of the arc tube pertaining to the present disclosure shown in FIG. 2. FIG. 13A is a side view, and FIG. 13B is a cross-sectional view corresponding to FIG. 13A. The only difference between the comparative example shown in FIG. 12 and the arc tube pertaining to the present disclosure is the location of the slit 12a.

In the comparative example, as shown in FIG. 12B, the slit 12a faces the welding point 5a1. Hence, when the end 12b of the coating foil 12 comes into contact with the end 7a of the metal foil 7 in the process of fitting the electrode rod 5a, the metal foil 7 and the coating foil 12 together, the edges of the coating foil 12, between which the slit 12a is formed, are likely to come close to the gap β near the welding point 5a1 of the electrode rod 5a connected to the metal foil 7. Here, when the coating foil 12 is brought into contact with the metal foil 7, it is expected that the force is concentrated on the above-mentioned edges of the coating foil 12. Therefore, there is a possibility that the end 12b of the coating foil is bent by the force applied to the edges of the coating foil 12. If bent, the end 12b of the coating foil 12 enters the gap β near the welding point 5a1 of the electrode rod 5a connected to the metal foil 7. It is expected that the coating foil 12 is likely to be bent when at least part of the edges of the coating foil 12, between which the slit 12a is formed, comes close to the gap β. This is because the coating foil 12 has a small thickness, i.e., 20 μm, and the edges 12b of the coating foil 12 easily enter the gap β between the electrode rod 5a and the metal foil 7.

If the coating foil 12 enters the gap β, the metal foil 7 and the coating foil 12, both made of molybdenum, overlap each other within the gap β. When such an overlapping portion is covered with the casing 1a made of glass, the influence of the difference in thermal expansion coefficient between molybdenum and glass will be notable, which might lead to breakage of the casing 1a of the sealing part 3.

In contrast, in the arc tube pertaining to the present disclosure, the slit 12a and the welding point 5a1 are located opposite with respect to the center point 5o of the electrode rod as shown in FIG. 13B. Hence, when the end 12b of the coating foil 12 comes into contact with the end 7a of the metal foil 7 in the process of fitting the electrode rod 5a, the metal foil 7 and the coating foil 12 together, the edges of the coating foil 12, between which the slit 12a is formed, do not come close to the gap β near the welding point 5a1 of the electrode rod 5a connected to the metal foil 7. Therefore, the end 12b of the coating foil 12 will not be bent. Consequently, the coating foil 12 is prevented from entering the gap β near the welding point 5a1 of the electrode rod 5a connected to the metal foil 7.

Figure 14:
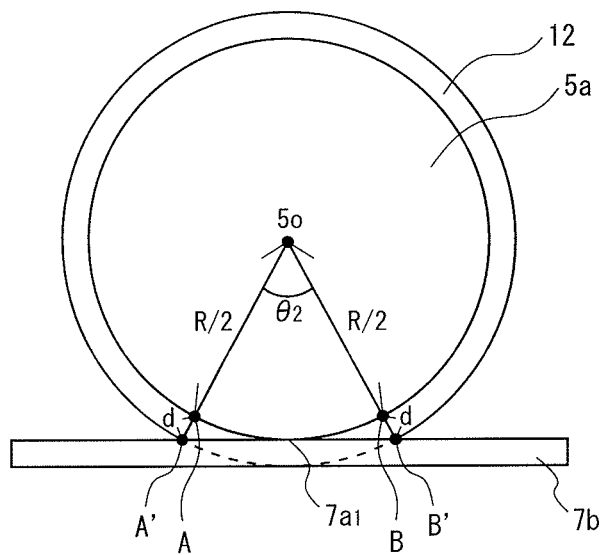
FIG. 14 is another drawing used for explaining the orientation of the slit provided in the coating foil of the arc tube shown in FIG. 2.

The following provides further explanations. FIG. 14 is a cross-sectional view of the electrode rod 5a and the coating foil 12. FIG. 14 shows that part of the end 12b of the coating foil 12 is located in the gap β near the welding point 5a1 of the electrode rod 5a connected to the metal foil 7. The point 7a1 is the welding point of the metal foil 7 connected to the electrode rod 5a, and the face 7b is a cross section of the metal foil 7 along a plane passing through the point 7a1. FIG. 15A through 15D each show a slit provided in the coating foil 12, facing a different direction.

First, as shown in FIG. 14, draw the lines connecting the center point 5o of the electrode rod 5a with points A and B on the edges of the coating foil 12. When these lines are extended away from the center point 5o by the thickness d of the coating foil 12, if they have intersection points A' and B' with the surface of the metal foil 7 on which the point of contact with the electrode rod 5a exists, the coating foil 12 is likely to enter the gap β near the welding point 5a1 of the electrode rod 5a connected to the metal foil 7.

The following describes specific examples.

Figure 15A:
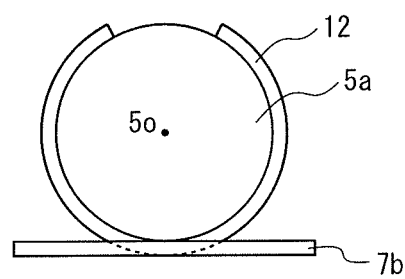
FIG. 15A is another drawing used for explaining the orientation of the slit provided in the coating foil of the arc tube shown in FIG. 2, and particularly shows that the slit is facing opposite the metal foil.
Figure 15B:
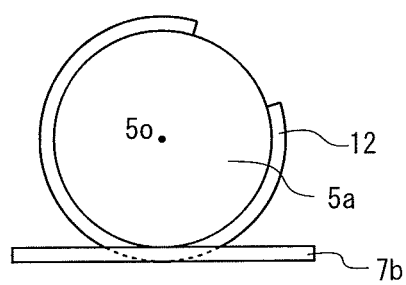
FIG. 15B is another drawing used for explaining the orientation of the slit provided in the coating foil of the arc tube shown in FIG. 2, and particularly shows that the slit is facing the direction slightly rotated clockwise from the opposite direction the metal foil.
Figure 15C:
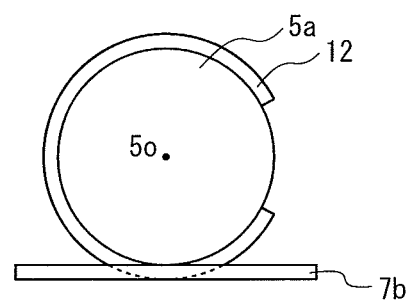
FIG. 15C is another drawing used for explaining the orientation of the slit provided in the coating foil of the arc tube shown in FIG. 2, and particularly shows that the slit is facing the direction rotated clockwise by approximately 90° from the opposite direction to the metal foil.
Figure 15D:
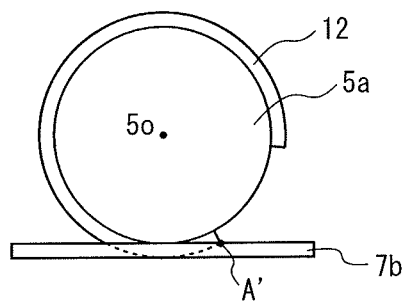
FIG. 15D is another drawing used for explaining the orientation of the slit provided in the coating foil of the arc tube shown in FIG. 2, and particularly shows that the slit is facing the direction slightly rotated counter clockwise from the direction of the metal foil.
Figure 15E:
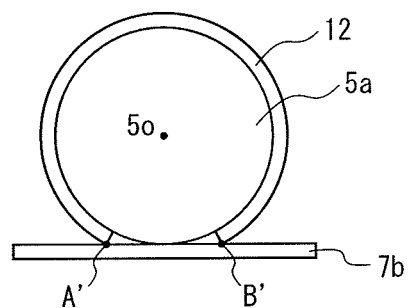
FIG. 15E is another drawing used for explaining the orientation of the slit provided in the coating foil of the arc tube shown in FIG. 2, and particularly shows that the slit is facing the metal foil.

In FIG. 15A through 15C, the line connecting the center point 5o of the electrode rod 5a with the point A on the edge of the coating foil 12 has no intersection with the surface of the metal foil 7. Therefore, the coating foil 12 is prevented from entering the gap β near the welding point 5a1 of the electrode rod 5a connected to the metal foil 7. On the other hand, in FIGS. 15D and 15E, the line connecting the center point 5o of the electrode rod 5a with the point A on the edges of the coating foil 12 has an intersection with the surface of the metal foil 7. Therefore, the coating foil 12 is not prevented from entering the gap β near the welding point 5a1 of the electrode rod 5a connected to the metal foil 7. That is, the slit of the coating foil 12 is preferably located as shown in FIGS. 15A through 15C, for example. In other words, the location of the slit can be described as follows: Returning to FIG. 14, in the cross-sectional view, the outer circumference of the coating foil 12 has two intersection points with the surface of the metal foil 7 on which the point of contact with the electrode rod 5a exists. The slit of the coating foil 12 shown in FIGS. 15A through 15C is not located in the area between the straight lines connecting the center point 5o with the intersection points. The slit of the coating foil 12 is located outside the area between the straight lines connecting the center point 5o with the intersection points.

When the lines connecting the center point 5o of the electrode rod 5a with points A and B on the edges of the coating foil 12 are extended away from the center point 5o, if they have no intersection with the surface of the metal foil 7 on which the point of contact with the electrode rod 5a exists, the coating foil 12 does not enter the gap β near the welding point 5a1 of the electrode rod 5a connected to the metal foil 7. Specifically, in the case of FIG. 15A and FIG. 15B, there is no risk that the coating foil 12 enters the gap β near the welding point 5a1 of the electrode rod 5a even when the slit of the coating foil 12 is displaced due to manufacturing error. That is, it can be said that the location of the slit of the coating foil 12 is more preferable when it is as shown in FIG. 15A or FIG. 15B.

It is possible to obtain the angle θ2 of the slit based on the ratio of the width of the slit of the coating foil 12 to the entire length of the circumference of the electrode rod 5a. It is also possible to obtain the angle θ2 even after attaching the coating foil 12 to the electrode rod 5a in the manufacturing process, by viewing the slit 12a of the coating foil 12 from a measurement point located in front of the slit 12a (i.e. viewing the slit 12a in the perpendicular direction to the central axis of the electrode rod 5a) and performing geometric calculation using the distance from the measurement point to the slit 12a and the width of the slit 12a. Furthermore, even after the sealing with the sealing part 3, the angle of the slit 12a can be obtained by observation involving cross section polishing or X-ray CT scanner or the like.

9. Modifications

The following describes modification examples of the arc tube pertaining to the present disclosure.

<Modification Examples of Electrode Rod>

Figure 16:
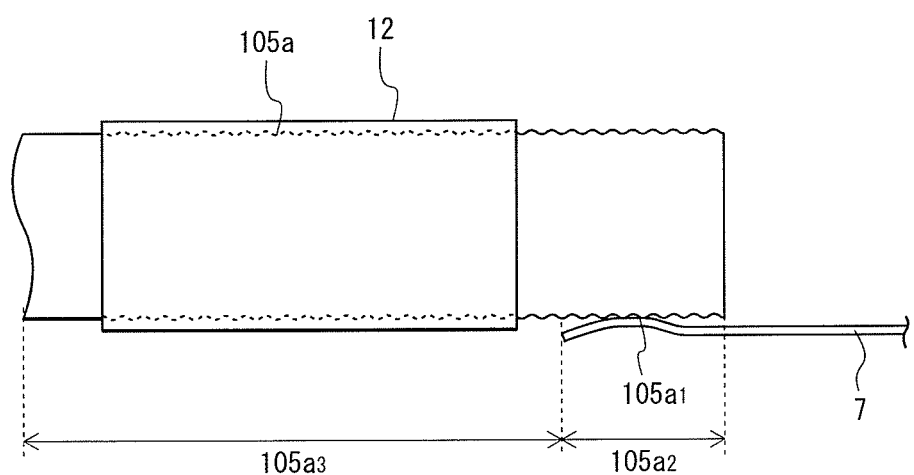
FIG. 16 shows a modification example of the electrode of the arc tube included in the high-pressure mercury lamp pertaining to the present disclosure.

FIG. 16 shows a modification example of the electrode of the arc tube included in the high-pressure mercury lamp pertaining to the present disclosure. Note that the glass casing is not depicted in the drawing as glass is transparent.

As shown in FIG. 16, the surface of the electrode rod 105a may be rough. The surface of the electrode rod 105a is processed by chemical etching, for example. Such processing prevents the occurrence of a crack when the metal foil 7, the coating foil 12 and the electrode rod 5a are sealed with the casing 1a. Note that such a crack occurs near the joint part 105a2 of the electrode rod 105a due to the difference in thermal expansion coefficient of the materials of the metal foil 7, the coating foil 12 and the electrode rod 5a. With such a structure, the degree of contact between the electrode rod 105a made of tungsten and the casing made of glass is small at the joint part 105a2 of the electrode rod 105a. Therefore, this structure reduces the influence of the difference between the thermal expansion coefficients. Note that the method for processing the surface of the electrode rod 105a is not limited to chemical etching, and it may be laser processing, cutting, or the like.

<Modifications of Metal Foil>

Figure 17A:
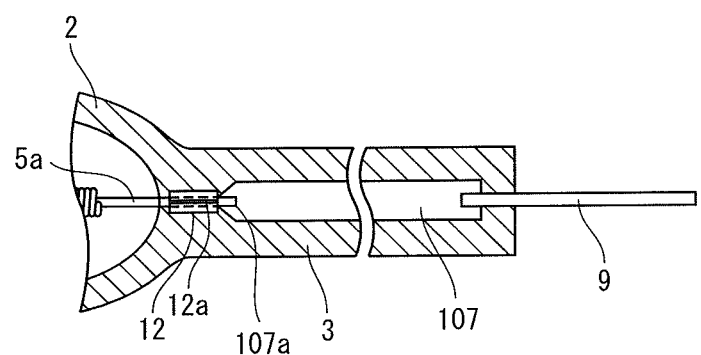
FIG. 17A shows a modification example of the coating foil, and specifically shows an enlarged view of a part of a cross section of the vicinity of the joint part between the electrode rod and the metal foil of the arc tube.
Figure 17B:
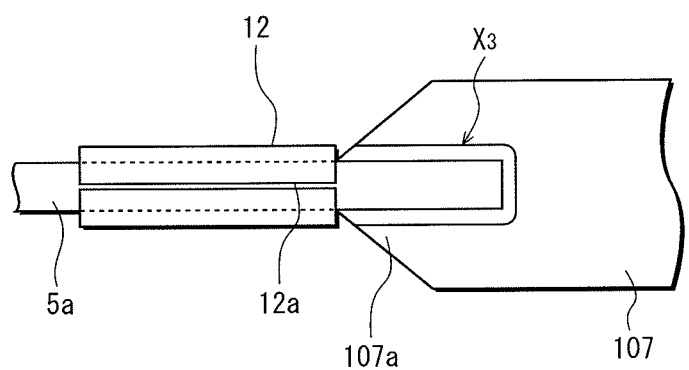
FIG. 17B shows a modification example of the coating foil, and specifically shows a top view of the vicinity of the joint part between the electrode rod and the metal foil of the arc tube.

FIGS. 17A and 17B show modification examples of the coating foil. Specifically, FIG. 17A shows an enlarged view of a part of a cross section of the vicinity of the joint part between the electrode rod and the metal foil of the arc tube, and FIG. 17B shows a top view of the vicinity of the joint part between the electrode rod and the metal foil of the arc tube.

As shown in FIG. 17A, the end 107a of the metal foil 107, which is close to the electrode rod 5a than the other end is, has a triangular shape. As shown in FIG. 17B, this structure reduces the space X3 fanned by the electrode rod 5a, the metal foil 107, and the inner surface of the casing. This is because glass easily enters the vicinity of the joint part during the sealing process.

<Modifications of Assembling Method>

In addition to the assembling method described above, the following method may be adopted to fit the electrode rod, the metal foil and the coating foil together.

FIG. 18A through 18D show the process of connecting the metal foil and the electrode rod coated with the coating foil for the arc tube shown in FIG. 2.

Figure 18A:
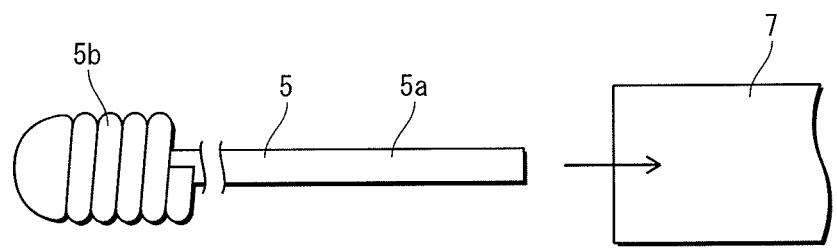
FIG. 18A shows a part of a process of connecting the metal foil and the electrode rod of the arc tube shown in FIG. 2, and specifically shows a step of positioning the electrode so that an end of the electrode rod overlaps the metal foil.

First, as shown in FIG. 18A, the electrode 5 is positioned such that the end of the electrode rod 5a overlaps the metal foil 7.

Figure 18B:
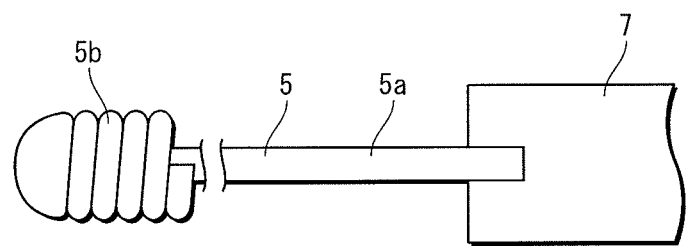
FIG. 18B shows a part of the process of connecting the metal foil and the electrode rod of the arc tube shown in FIG. 2, and specifically shows a step of connecting the metal foil and the electrode rod.

Next, as shown in FIG. 18B, the electrode rod 5a and the metal foil 7 are connected together. Specifically, the electrode rod 5a and the metal foil 7 are connected by point welding, for example.

Figure 18C:
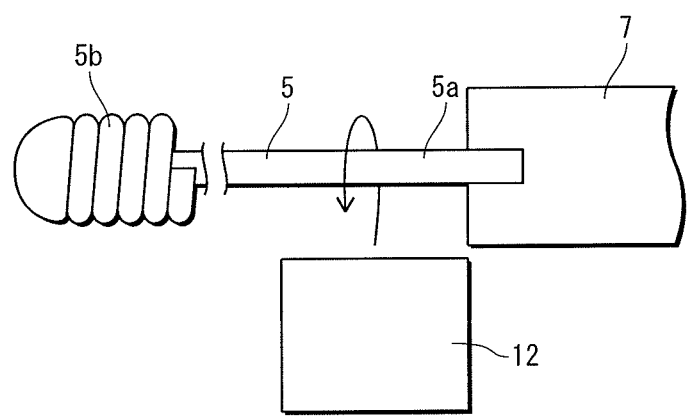
FIG. 18C shows a part of the process of connecting the metal foil and the electrode rod of the arc tube shown in FIG. 2, and specifically shows a step of winding the metal foil around the electrode rod.

Furthermore, as shown in FIG. 18C, the coating foil 12 is wound around the electrode rod 5a. After that, the electrode rod 5a and the coating foil 12 are connected by point welding, for example.

Figure 18D:
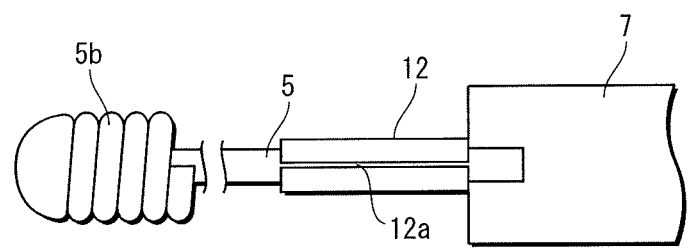
FIG. 18D shows a part of the process of connecting the metal foil and the electrode rod of the arc tube shown in FIG. 2, and specifically shows the electrode rod, the metal foil and the coating foil at the completion of the process.

By the above-described process, the electrode rod 5a, the metal foil 7 and the coating foil 12 are fitted together as shown in FIG. 18D.

In the description above, the coating foil 12 is formed by bending a metal material. However, the present invention is not limited in this way. For example, the coating foil 12 may be formed by pultrusion molding.

<<Embodiment 2>>

Figure 19:
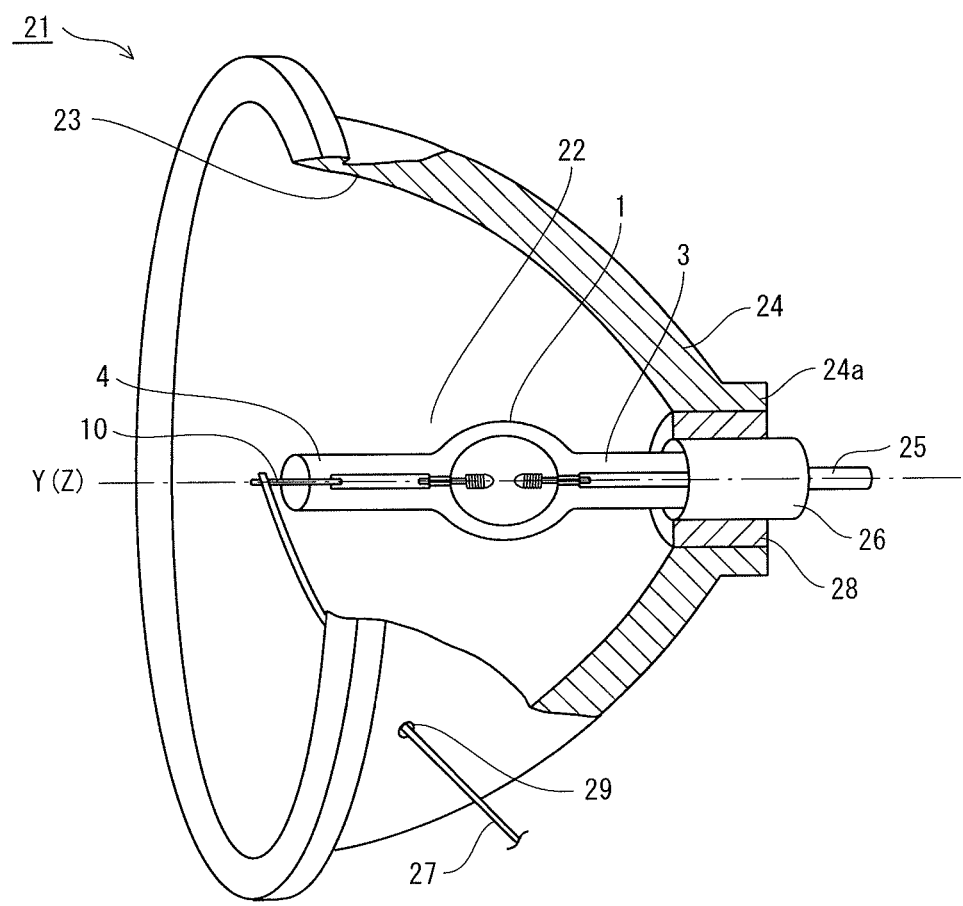
FIG. 19 is a partially cutaway perspective view showing a structure of a lamp unit as Embodiment 2 of the present invention.

FIG. 19 is a partially cutaway perspective view showing a structure of a lamp unit 21 as Embodiment 2 of the present invention. In FIG. 19, the Y axis shows the central axis of a high-pressure mercury lamp in the longitudinal direction, and the Z axis show the optical axis of a reflection mirror.

As shown in FIG. 19, the lamp unit 21 includes a high-pressure mercury lamp 22 and a reflection mirror 24. The high-pressure mercury lamp 22 has the arc tube 1 pertaining to Embodiment 1 described above. The internal surface of the reflection mirror 24 has a reflection surface 23, and the main body of the reflection mirror 24 is made of glass. The high-pressure mercury lamp 22 is built into the reflection mirror 24 such that the central axis Y of the high-pressure mercury lamp 22 in the longitudinal direction coincides with the optical axis Z of the reflection mirror 24. The lamp unit 21 is configured such that the reflection surface 23 reflects off the light emitted by the high-pressure mercury lamp 22.

The high-pressure mercury lamp 22 includes, in addition to the arc tube 1, a base 26 to be attached to one of the sealing parts 3 of the arc tube 1. The base 26 is cylindrical and is provided with a connector terminal 25 to which a power source is connected. The external lead wire 9 of the arc tube 1 is connected to the connector terminal 25 (not depicted in the drawing). The external lead wire 10 at the opposite end of the arc tube 1 is connected with a power supply line 27.

The base 26 of the high-pressure mercury lamp 22 is inserted into a neck part 24a of the reflection mirror 24, and is fixed to the neck part 24a with an adhesive 28. The power supply line 27 passes through a through hole 29 provided in the reflection mirror 24.

The reflection surface 23 has a spheroidal shape or a shape of paraboloid of revolution, for example. A multilayered interference film or the like is formed on the reflection surface 23 by vapor deposition.

The above-described structure of the lamp unit 21 pertaining to Embodiment 2 of the present invention further prevents breakage of the casing of the sealing part of the arc tube. This leads to realization of a high output lamp unit.

In Embodiment 2 above, the high-pressure mercury lamp 22 includes the base 26. However, instead of the base 26, cement may be used to fix the high-pressure discharge lamp 22 to the reflection mirror 24.

<<Embodiment 3>>

Figure 20:
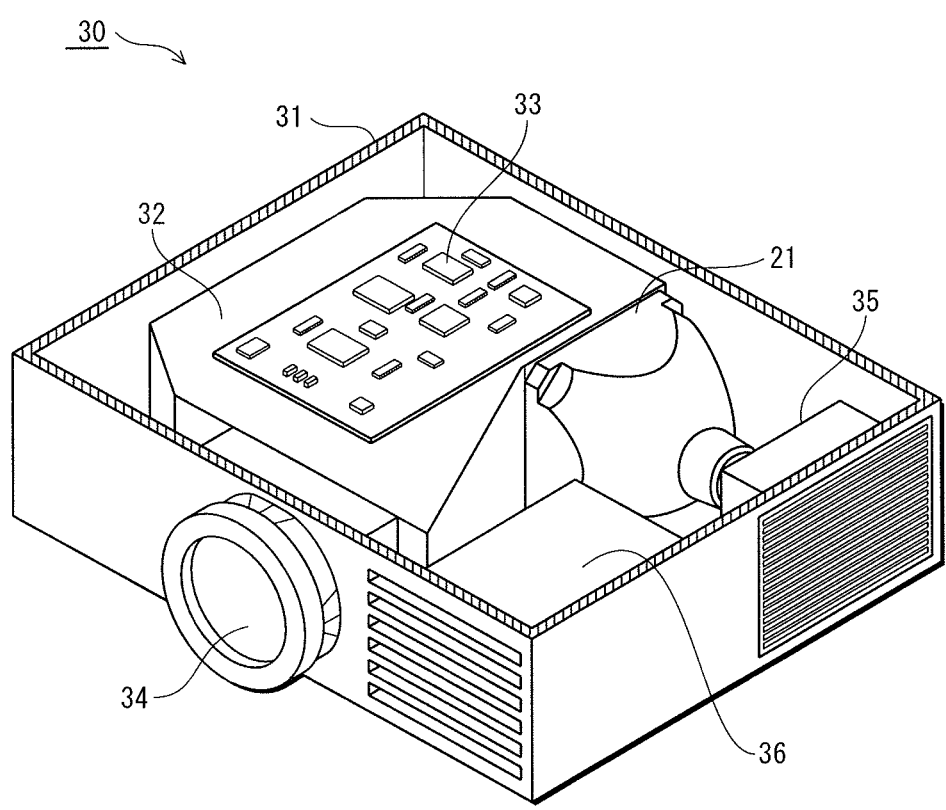
FIG. 20 is a partially cutaway perspective view showing a structure of a front projector, which is an example of a projector-type image display apparatus as Embodiment 3 of the present invention.
Figure 21:
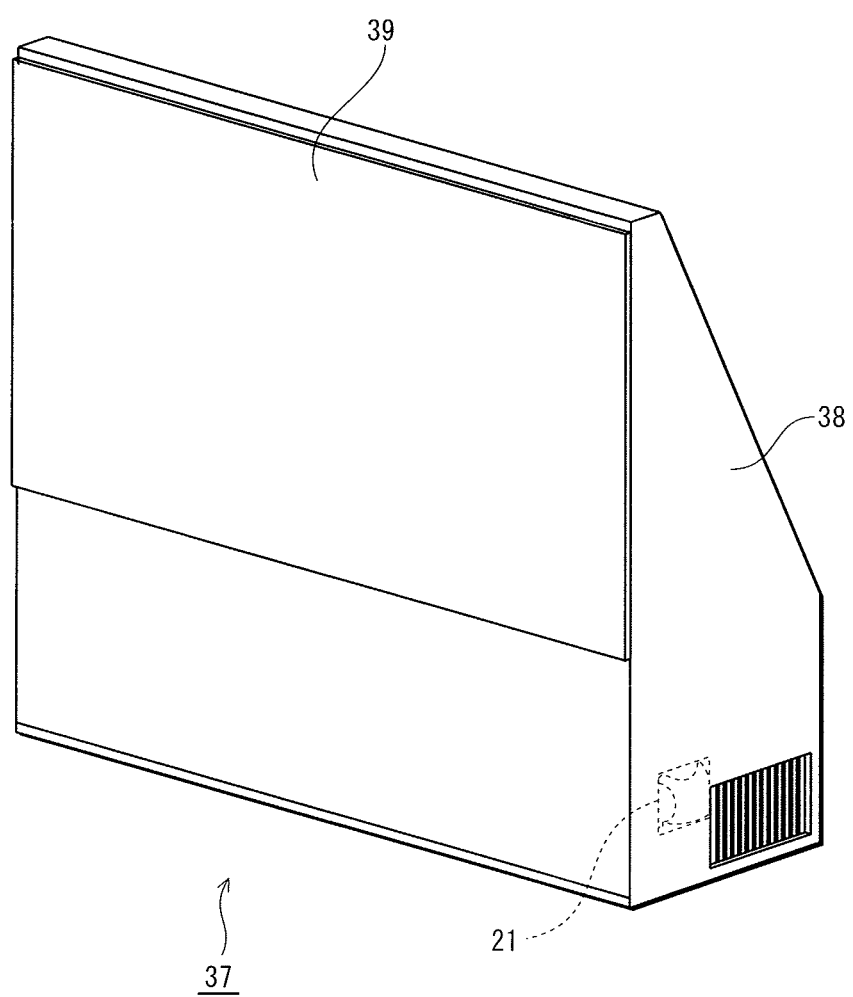
FIG. 21 is a partially cutaway perspective view showing a structure of a rear projector, which is an example of the projector-type image display apparatus.

The following describes a projector-type image display apparatus as Embodiment 3 of the present invention, with reference to FIGS. 20 and 21.

FIG. 20 is a partially cutaway perspective view showing a structure of a front projector 30, which is an example of a projector-type image display apparatus as Embodiment 3 of the present invention utilizing the lamp unit 21. The front projector 30 projects images onto a screen (not depicted in the drawing) located in front of the front projector 30. Note that the top board of a housing 31, which will be described later, is not depicted in FIG. 20.

The front projector 30 includes a lamp unit 21 as a light source, an optical unit 32, a control unit 33, a projection lens 34, a cooling fan unit 35, and a power source unit 36. These components are housed in the housing 31. The optical unit 32 includes an image formation unit and an illumination unit, which are not depicted in the drawing. The image formation unit forms images by modulating the incident light. The illumination unit irradiates the image formation unit with the illuminating light emitted by the lamp unit 21. The optical unit 32 has a color wheel or the like (not depicted in the drawing) with color filters of three colors, and divides the illuminating light into three primary colors. The control unit 33 drives and controls the image formation unit and so on. The projection lens 34 magnifies the optical images formed by the image formation unit modulating the incident light. The power source unit 36 converts power supply from a commercial power source to be in the form suitable for the control unit 33 and the lamp unit 21, and supplies the converted power to them.

The lamp unit 21 can also be used as a power source of a rear projector. FIG. 21 is a perspective view showing a structure of a rear projector.

A rear projector 37 includes the lamp unit 21, an optical unit, a projection lens, a mirror, and so on, which are not depicted in the drawing. These components are housed in a housing 38. In the rear projector 37, the images are projected from the projection lens, and are reflected off the mirror. The reflected images are projected from the rear side of a translucent screen 39.

The above-described structure of the projector-type image display apparatus pertaining to Embodiment 3 of the present invention realizes a projector-type image display apparatus with a long lifespan.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

REFERENCE SIGNS LIST

1. Arc tube
1a Casing
2 Light-emitting part
3, 4 Sealing part
5, 6 Electrode
5a, 5a Electrode rod
5a1 Welding point
5a2 Joint part
5a3 Non-joint part
5b, 6b Electrode coil
7, 8 Metal foil
7a End
9, 10 External lead wire
11 Discharge space
12, 13 Coating foil
12a, 13a Slit
12b End
21 Lamp unit
22 High-pressure discharge lamp (High-pressure mercury lamp)
24 Reflection mirror
30 Projector-type image display apparatus (Front projector)

What is claimed is:

1. A high-pressure discharge lamp comprising an arc tube, wherein the arc tube includes:
   a light-emitting part within which a discharge space is formed; sealing parts connected to the light-emitting part; and a casing made of glass and housing the light-emitting part and the sealing parts,
   a pair of electrode rods are disposed within the casing such that (i) tips of the electrode rods face each other with a gap therebetween and project into the discharge space, (ii) a base end of each electrode rod is embedded in a corresponding one of the sealing parts, and (iii) the base end of each electrode rod overlaps, and is thus in contact with, a surface of a corresponding one of metal foils respectively provided in the sealing parts,
   each electrode rod is partially coated with a coating foil that is made of metal and has a C-like cross section with a slit formed between edges thereof,
   an end of the coating foil farthest from the light-emitting part is located closer to the light-emitting part than an end of the metal foil closest to the light-emitting part, and
   in a cross-sectional view of each electrode rod along a perpendicular plane to a central axis thereof,
      an outer circumference of the coating foil has two intersection points with the surface of the metal foil on which a point of contact with the electrode rod exists, and
      the slit of the coating foil is located outside an area between straight lines connecting a center point of the electrode rod with the intersection points.

2. The high-pressure discharge lamp in claim 1, wherein in the cross-sectional view,
   an angle $\theta 1$ of the slit satisfies $5° < \theta 1 < 180°$, where the angle $\theta 1$ is defined as an angle formed between two straight lines connecting the center point with the edges of the coating foil.

3. The high-pressure discharge lamp in claim 1, wherein in the cross-sectional view,
   the slit is located such that the two straight lines connecting the center point with the edges of the coating foil have no intersection point with the surface of the metal foil.

4. The high-pressure discharge lamp in claim 1, wherein each electrode rod has a diameter equal to or greater than 0.45 mm.

5. The high-pressure discharge lamp in claim 1, wherein the high-pressure discharge lamp has a power rating equal to or greater than 300 W.

6. A lamp unit comprising:
   the high-pressure discharge lamp defined in claim 1; and
   a reflection mirror having a concave reflection surface, wherein
   the reflection mirror is attached to the high-pressure discharge lamp so that the reflection surface reflects light emitted by the high-pressure discharge lamp.

7. A projector-type image display apparatus, comprising:
   the lamp unit defined in claim 6;
   an optical unit that modulates illuminating light from the lamp unit to form an optical image; and
   a projection device that magnifies and projects the optical image.

8. The high-pressure discharge lamp in claim 1, wherein in a cross-sectional view of each electrode rod along a perpendicular plane to a central axis thereof,
   the slit of the coating foil is not located inside an area between straight lines connecting a center point of the electrode rod with the intersection points.

* * * * *